(12) United States Patent
Zhou et al.

(10) Patent No.: US 11,934,233 B2
(45) Date of Patent: Mar. 19, 2024

(54) CONTROL METHOD FOR AUDIO DEVICE, AUDIO DEVICE AND STORAGE MEDIUM

(71) Applicant: GOERTEK INC., Weifang (CN)

(72) Inventors: Haipeng Zhou, Weifang (CN); Li Ding, Weifang (CN); Shumin Zhou, Weifang (CN); Xiaochen Wang, Weifang (CN); Ke Dong, Weifang (CN)

(73) Assignee: GOERTEK INC., Shandong (CN)

( * ) Notice: Subject to any disclaimer, the term of this patent is extended or adjusted under 35 U.S.C. 154(b) by 257 days.

(21) Appl. No.: 17/395,569

(22) Filed: Aug. 6, 2021

(65) Prior Publication Data

US 2021/0365081 A1 Nov. 25, 2021

Related U.S. Application Data

(63) Continuation of application No. PCT/CN2019/130673, filed on Dec. 31, 2019.

(30) Foreign Application Priority Data

Nov. 15, 2019 (CN) .......................... 201911126109.9

(51) Int. Cl.
*G06F 1/16* (2006.01)
*G06F 3/16* (2006.01)
(Continued)

(52) U.S. Cl.
CPC .......... *G06F 1/1694* (2013.01); *G06F 1/1632* (2013.01); *G06F 3/167* (2013.01);
(Continued)

(58) Field of Classification Search
CPC .......... H02J 50/90; H02J 50/12; H02J 50/801; H02J 50/10; H04W 52/0209;
(Continued)

(56) References Cited

U.S. PATENT DOCUMENTS 7,808,779 B2 * 10/2010 Lum ..................... G06F 1/1632
439/55
8,773,845 B2 * 7/2014 Leung ................... G06F 1/1632
361/679.01
(Continued)

FOREIGN PATENT DOCUMENTS

CN 102957801 A 3/2013
CN 103576752 A 2/2014
(Continued)

OTHER PUBLICATIONS

International Search Report issued in corresponding International Application No. PCT/CN2019/130673; dated Jun. 30, 2020; State Intellectual Property Office of the P.R. China, Beijing, China, 6 pgs.
(Continued)

*Primary Examiner* — William Lu
(74) *Attorney, Agent, or Firm* — HAUPTMAN HAM, LLP

(57) ABSTRACT

Disclosed is a control method for an audio device, the audio device includes a wireless charging module and a display screen, and the control method for the audio device includes the following steps: in response to detecting a mobile device is placed on the audio device, acquiring a screen placement state of the mobile device, the screen placement state includes at least one of a screen flat state, a screen horizontal state and a screen vertical state; and displaying display content of the display screen on a screen of the mobile device according to the screen placement state. This disclosure further provides an audio device and a computer-readable storage medium. The problem that the display effect of the display screen of the audio device will be affected when the audio device performs wireless charging for the mobile device has been solved.

19 Claims, 6 Drawing Sheets

(51) Int. Cl.
  *H02J 50/10* (2016.01)
  *H04R 3/00* (2006.01)
  *H04S 7/00* (2006.01)
(52) U.S. Cl.
  CPC .............. *H02J 50/10* (2016.02); *H04R 3/005* (2013.01); *H04S 7/303* (2013.01); *G06F 2200/1614* (2013.01); *G06F 2200/1637* (2013.01)
(58) Field of Classification Search
  CPC ...... G06F 1/1694; G06F 1/1632; G06F 3/167; G06F 2200/1614; G06F 2200/1637; G06F 3/14; H04R 3/005; H04R 2420/07; H04R 2499/11; H04R 1/028; H04R 3/00; H04R 29/001; H04R 1/023; H04R 1/04; H04R 2201/02; H04S 7/303
  See application file for complete search history.

(56) References Cited

U.S. PATENT DOCUMENTS

| | | | | |
|---|---|---|---|---|
| 8,780,548 | B2* | 7/2014 | Lee | G06F 1/1616 |
| | | | | 361/679.44 |
| 9,184,619 | B2* | 11/2015 | Nylen | H02J 50/90 |
| 9,564,940 | B2* | 2/2017 | Park | H02J 50/90 |
| 9,755,437 | B2* | 9/2017 | Kuusilinna | H02J 7/00034 |
| 10,615,613 | B2* | 4/2020 | Calhoun | H02J 7/0013 |
| 11,240,365 | B1* | 2/2022 | Hulbert | H04M 1/724092 |
| 2004/0114772 | A1* | 6/2004 | Zlotnick | H04R 3/12 |
| | | | | 381/92 |
| 2005/0089164 | A1* | 4/2005 | Lang | H04N 21/8355 |
| | | | | 348/E7.056 |
| 2010/0204955 | A1* | 8/2010 | Roche | A61B 34/20 |
| | | | | 702/159 |
| 2010/0321275 | A1* | 12/2010 | Hinckley | G06F 1/1618 |
| | | | | 345/1.3 |
| 2011/0037739 | A1* | 2/2011 | Burge | H04N 5/642 |
| | | | | 345/204 |
| 2011/0050164 | A1* | 3/2011 | Partovi | H04B 5/0037 |
| | | | | 320/108 |
| 2012/0162073 | A1* | 6/2012 | Kryze | G06F 3/041 |
| | | | | 345/158 |
| 2012/0214544 | A1* | 8/2012 | Shivappa | H04M 1/72457 |
| | | | | 455/556.1 |
| 2012/0299966 | A1* | 11/2012 | Kim | H02J 50/90 |
| | | | | 705/40 |
| 2012/0300089 | A1* | 11/2012 | Sbaiz | G06V 20/70 |
| | | | | 348/222.1 |
| 2013/0057571 | A1* | 3/2013 | Harris | G06F 1/1613 |
| | | | | 345/619 |
| 2013/0076598 | A1* | 3/2013 | Sirpal | G06F 3/1446 |
| | | | | 345/1.3 |
| 2013/0141464 | A1* | 6/2013 | Hunt | G06F 3/0346 |
| | | | | 345/659 |
| 2013/0300671 | A1* | 11/2013 | Hallerstrom Sjostedt | |
| | | | | G06F 1/1649 |
| | | | | 345/173 |
| 2014/0049211 | A1* | 2/2014 | Park | H02J 7/0042 |
| | | | | 320/108 |
| 2014/0270188 | A1* | 9/2014 | Hall | H04S 5/00 |
| | | | | 381/17 |
| 2015/0002088 | A1* | 1/2015 | D'Agostino | H02J 50/70 |
| | | | | 320/108 |
| 2015/0123606 | A1* | 5/2015 | Tew | H02J 50/80 |
| | | | | 320/108 |
| 2015/0168538 | A1* | 6/2015 | Bradley | G01S 5/18 |
| | | | | 367/127 |
| 2015/0357862 | A1* | 12/2015 | Saari | H04M 1/72409 |
| | | | | 340/10.5 |
| 2016/0066086 | A1* | 3/2016 | Döbler | H04R 5/027 |
| | | | | 348/47 |
| 2016/0100265 | A1* | 4/2016 | Maggiore | G06F 16/9535 |
| | | | | 381/56 |
| 2016/0118179 | A1* | 4/2016 | Park | H01F 27/2871 |
| | | | | 320/108 |
| 2016/0293142 | A1* | 10/2016 | Bowden | G06F 3/147 |
| 2016/0320801 | A1* | 11/2016 | Buss | H02J 7/0042 |
| 2017/0031001 | A1* | 2/2017 | Calvarese | G01S 5/22 |
| 2017/0062012 | A1* | 3/2017 | Bloch | G11B 27/36 |
| 2017/0083125 | A1* | 3/2017 | Dow | G06F 3/043 |
| 2017/0140738 | A1* | 5/2017 | Chen | G09G 5/00 |
| 2017/0165840 | A1* | 6/2017 | Lee | G06V 40/166 |
| 2017/0168135 | A1* | 6/2017 | Want | G01S 5/30 |
| 2017/0170678 | A1* | 6/2017 | Uhm | H02J 50/70 |
| 2018/0278099 | A1* | 9/2018 | Hong | H02J 50/12 |
| 2018/0351373 | A1* | 12/2018 | Behzadi | H02J 7/0049 |
| 2019/0089185 | A1* | 3/2019 | Zhang | H02J 50/23 |
| 2019/0271940 | A1* | 9/2019 | Eom | G06F 3/017 |
| 2020/0091755 | A1* | 3/2020 | Larsson | H02J 7/0044 |
| 2020/0293090 | A1* | 9/2020 | Kanda | H02J 7/0047 |
| 2021/0028636 | A1* | 1/2021 | Kleeman | H04R 1/24 |
| 2021/0119470 | A1* | 4/2021 | Zeng | H02J 7/0044 |
| 2021/0234403 | A1* | 7/2021 | Ku | G06F 1/266 |
| 2021/0365081 | A1* | 11/2021 | Zhou | H04R 1/028 |
| 2021/0399578 | A1* | 12/2021 | D'Amato | H02J 50/90 |
| 2022/0137491 | A1* | 5/2022 | Stankie | F16M 11/041 |
| | | | | 396/428 |
| 2022/0150347 | A1* | 5/2022 | Hulbert | H04M 1/72448 |
| 2023/0021589 | A1* | 1/2023 | Lin | G01S 15/74 |
| 2023/0078934 | A1* | 3/2023 | Edwards | G06F 3/0489 |
| | | | | 345/173 |

FOREIGN PATENT DOCUMENTS

| | | |
|---|---|---|
| CN | 105278910 A | 1/2016 |
| CN | 106027807 A | 10/2016 |
| CN | 107885472 A | 4/2018 |
| CN | 108196807 A | 6/2018 |
| CN | 108446085 A | 8/2018 |
| CN | 207801545 U | 8/2018 |
| CN | 108958693 A | 12/2018 |
| CN | 208522496 U | 2/2019 |
| CN | 110083330 A | 8/2019 |
| CN | 110347284 A | 10/2019 |
| JP | 2019140624 A | 8/2019 |
| KR | 20130004821 A | 1/2013 |
| KR | 20180059405 A | 6/2018 |

OTHER PUBLICATIONS

First Office Action issued in corresponding Chinese Application No. 201911126109.9; dated Aug. 10, 2020; State Intellectual Property Office of the P.R. China, Beijing, China, 15 pgs.

Second Office Action issued in corresponding Chinese Application No. 201911126109.9; dated Jan. 18, 2021; State Intellectual Property Office of the P.R. China, Beijing, China, 14 pgs.

Notice of Grant issued in corresponding Chinese Application No. 201911126109.9; dated Apr. 28, 2021; State Intellectual Property Office of the P.R. China, Beijing, China, 5 pgs.

Written Opinion issued in corresponding International Application No. PCT/CN2019/130673; dated Jun. 30, 2020; State Intellectual Property Office of the P.R. China, Beijing, China, 5 pgs.

* cited by examiner

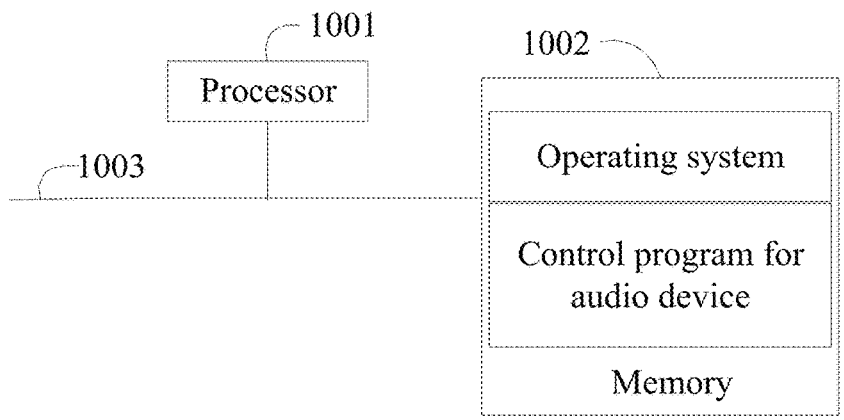

FIG. 1

| In response to detecting a mobile device is placed on the audio device, acquiring a screen placement state of the mobile device, and the screen placement state includes at least one of a screen flat state, a screen horizontal state and a screen vertical state | S10 |

↓

| Displaying display content of the display screen on a screen of the mobile device according to the screen placement state | S20 |

FIG. 2

| In response to detecting a mobile device is placed on the audio device, acquiring a screen placement state of the mobile device, and the screen placement state includes at least one of a screen flat state, a screen horizontal state and a screen vertical state | S10 |

↓

| In a determination that the screen placement state is the screen flat state, acquiring a position of a user | S30 |

↓

| Determining the display mode according to the position of the user | S31 |

↓

| Displaying the display content of the display screen on the screen of the mobile device according to the display mode | S50 |

FIG. 3

CONTROL METHOD FOR AUDIO DEVICE, AUDIO DEVICE AND STORAGE MEDIUM

CROSS REFERENCE TO RELATED APPLICATIONS

This disclosure is a Continuation Application of International Application No. PCT/CN2019/130673, filed on Dec. 31, 2019, which claims the priority to Chinese Patent Application No. 201911126109.9, entitled "CONTROL METHOD FOR AUDIO DEVICE, AUDIO DEVICE AND STORAGE MEDIUM", submitted to the China National Intellectual Property Administration on Nov. 15, 2019, which is hereby incorporated by reference in its entirety.

TECHNICAL FIELD

This disclosure relates to the technical field of audio devices, in particular to a control method for an audio device, an audio device and a computer-readable storage medium.

BACKGROUND

With the rapid development of smart loudspeaker device technology, there is a loudspeaker device equipped with a wireless charging module and a display screen, so that the human-computer interaction experience of the smart loudspeaker with the user can be enhanced by the display screen, and some mobile devices of the user can also be charged conveniently through the wireless charging module of the smart loudspeaker.

However, due to the large body and screen of the mobile device, when the mobile device is placed on the loudspeaker device for charging, it will often shield the display screen of the loudspeaker device, thus affecting the display effect of the display screen of the loudspeaker device.

The above content is only used to assist the understanding of the technical solution of this disclosure, and does not mean that the above content is recognized as the prior art.

SUMMARY

The main object of this disclosure is to provide a control method for an audio device, an audio device and a computer-readable storage medium, which solves the problem that the display effect of the display screen of the audio device will be affected when the audio device performs wireless charging for the mobile device.

In order to achieve the above object, this disclosure provides a control method for an audio device, the audio device includes a wireless charging module and a display screen, and the control method for the audio device includes the following steps:

in response to detecting a mobile device is placed on the audio device, acquiring a screen placement state of the mobile device, the screen placement state includes at least one of a screen flat state, a screen horizontal state and a screen vertical state; and displaying display content of the display screen on a screen of the mobile device according to the screen placement state.

Optionally, the step of displaying display content of the display screen on a screen of the mobile device according to the screen placement state includes:

determining a display mode according to the screen placement state; and displaying the display content of the display screen on the screen of the mobile device according to the display mode.

Optionally, the step of determining a display mode according to the screen placement state includes:

in a determination that the screen placement state is the screen flat state, acquiring a position of a user; and determining the display mode according to the position of the user.

Optionally, the step of determining a display mode according to the screen placement state includes:

in a determination that the screen placement state is the screen horizontal state, acquiring a placement mode of the mobile device when placed; and determining the display mode according to the placement mode.

Optionally, the step of acquiring a screen placement state of the mobile device includes any of the following:

acquiring the screen placement state of the mobile device according to a sensor of the mobile device;

acquiring the screen placement state of the mobile device according to a sensor of the audio device;

acquiring the screen placement state of the mobile device according to a microphone array of the audio device; and acquiring the screen placement state of the mobile device according to a position state of the display screen, the position state includes a first position state and a second position state, a plane where the display screen is located is parallel to a horizontal plane when the display screen is in the first position state, and an included angle between the plane where the display screen is located and the horizontal plane is a preset angle when the display screen is in the second position state.

Optionally, the step of acquiring the screen placement state of the mobile device according to a microphone array of the audio device includes:

in response to detecting the mobile device is placed on the audio device, acquiring a shielding area generated by the mobile device shielding a playback area of the microphone array; and acquiring the screen placement state of the mobile device according to the shielding area.

Optionally, the control method for the audio device further includes:

in response to detecting the mobile device is placed on the audio device, acquiring the screen placement state of the mobile device according to at least one of: whether the sensor or the microphone array obtains a signal, a strength of the signal obtained by the sensor or the microphone array, and an order in which the sensor or the microphone array obtains the signal; and the sensor is at least one of the sensor of the audio device or the sensor of the mobile device, and the sensor is at least one group.

Optionally, the audio device includes a playing component and a display apparatus rotatably connected to the playing component, and the display apparatus includes the wireless charging module and the display screen.

In order to achieve the above object, this disclosure further provides an audio device, the audio device includes a wireless charging module and a display screen, and the audio device includes:

a memory, a processor, and a control program for the audio device stored on the memory and operable on the processor, and when the control program for the audio device is executed by the processor, the steps of the control method for the audio device as described above are implemented.

In order to achieve the above object, this disclosure further provides a computer-readable storage medium, a control program for an audio device is stored thereon, and when the control program for the audio device is executed by a processor, the steps of the control method for the audio device as described above are implemented.

This disclosure provides a control method for an audio device, an audio device and a computer-readable storage medium. In response to detecting a mobile device is placed on the audio device, a screen placement state of the mobile device is acquired, and the screen placement state includes at least one of a screen flat state, a screen horizontal state and a screen vertical state; and display content of the display screen is displayed on a screen of the mobile device according to the screen placement state. In this way, the problem that the display effect of the display screen of the audio device will be affected when the audio device performs wireless charging for the mobile device has been solved.

BRIEF DESCRIPTION OF THE DRAWINGS

In order to more clearly explain the embodiments of this disclosure or the technical solutions in the related art, the drawings used in the description of the embodiments or the related art will be briefly introduced below. Obviously, the drawings in the following description are merely part of the drawings of this disclosure. For those of ordinary skill in the art, other drawings can be obtained based on these drawings without paying creative work.

FIG. 1 is a schematic diagram of a hardware operating environment of a terminal according to an embodiment of this disclosure.

FIG. 2 is a flow chart of a first embodiment of a control method for an audio device according to this disclosure.

FIG. 3 is a flow chart of a second embodiment of the control method for the audio device according to this disclosure.

Figure 4:
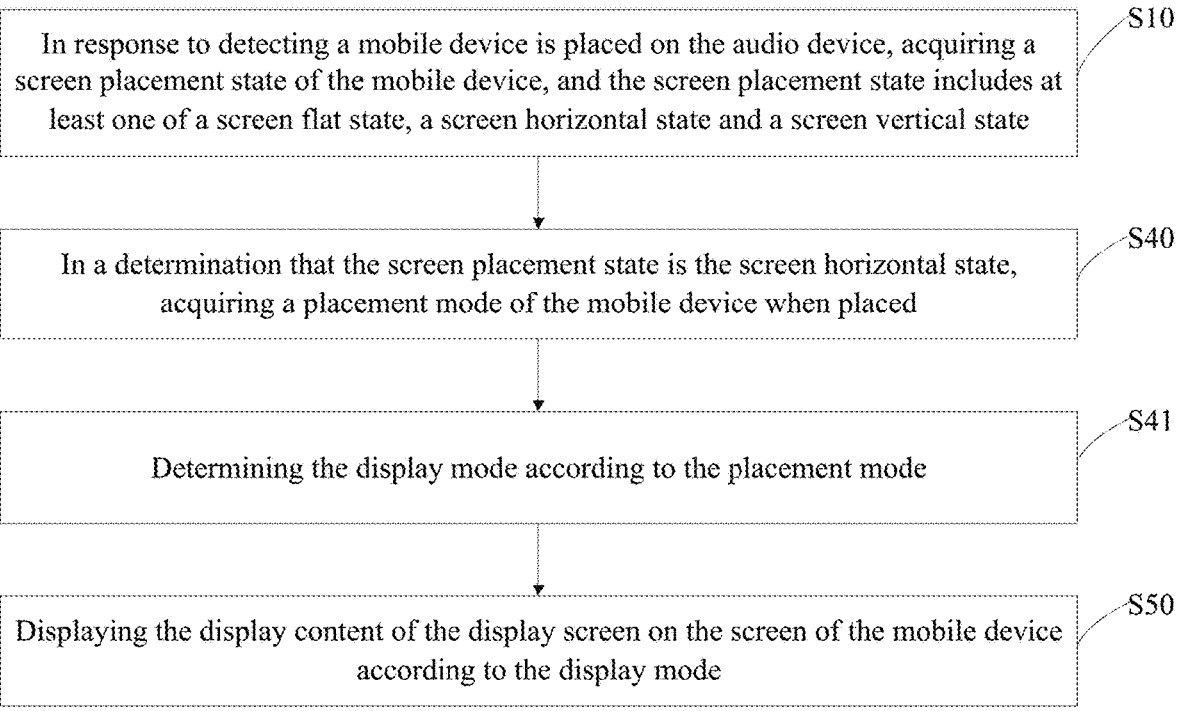
FIG. 4 is a flow chart of a third embodiment of the control method for the audio device according to this disclosure.

The realization of the objects, functional characteristics and advantages of this disclosure will be further described in conjunction with the embodiments and with reference to the drawings.

DETAILED DESCRIPTION OF THE EMBODIMENTS

It should be understood that the specific embodiments described herein are only used to explain this disclosure, and are not used to limit this disclosure.

This disclosure provides a control method for an audio device, which solves the problem that the display effect of the display screen of the audio device will be affected when the audio device performs wireless charging for the mobile device.

As shown in FIG. 1, FIG. 1 is a schematic diagram of a hardware operating environment of a terminal according to an embodiment of this disclosure.

The terminal in this embodiment of this disclosure may be an audio device, or may be a server or a control terminal that controls the audio device.

Referring to FIG. 1, the terminal may include: a processor 1001, such as a Central Processing Unit (CPU), a memory 1002, and a communication bus 1003. The communication bus 1003 is configured to realize the connection communication between the components in the terminal. The memory 1002 can be either a high-speed random-access memory (RAM) or a stable non-volatile memory, such as a disk memory. Optionally, the memory 1002 may be a storage device independent of the foregoing processor 1001.

Those skilled in the art may understand that the structure of the terminal shown in FIG. 1 does not constitute a limitation on the terminal, and more or less components than those illustrated may be included in the terminal, or certain components may be combined, or different components may be arranged.

As shown in FIG. 1, the memory 1002 as a computer-readable storage medium may include a control program for an audio device.

In the terminal shown in FIG. 1, the processor 1001 can be configured to call the control program for the audio device stored on the memory 1002 and perform the following operations:

in response to detecting that a mobile device is placed on the audio device, acquiring a screen placement state of the mobile device, and the screen placement state includes at least one of a screen flat state, a screen horizontal state and a screen vertical state; and displaying display content of the display screen on a screen of the mobile device according to the screen placement state.

Further, the processor 1001 may call the control program for the audio device stored on the memory 1002 and further performs the following operations:

determining a display mode according to the screen placement state; and displaying the display content of the display screen on the screen of the mobile device according to the display mode.

Further, the processor 1001 may call the control program for the audio device stored on the memory 1002 and further performs the following operations:

in a determination that the screen placement state is the screen flat state, acquiring a position of a user; and determining the display mode according to the position of the user.

Further, the processor 1001 may call the control program for the audio device stored on the memory 1002 and further performs the following operations:

in a determination that the screen placement state is the screen horizontal state, acquiring a placement mode of the mobile device when placed; and determining the display mode according to the placement mode.

Further, the processor 1001 may call the control program for the audio device stored on the memory 1002 and further performs the following operations:

acquiring the screen placement state of the mobile device according to a sensor of the mobile device;

acquiring the screen placement state of the mobile device according to a sensor of the audio device;

acquiring the screen placement state of the mobile device according to a microphone array of the audio device; and acquiring the screen placement state of the mobile device according to a position state of the display screen, the position state includes a first position state and a second position state, a plane where the display screen is located is parallel to a horizontal plane when the display screen is in the first position state, and an included angle between the plane where the display screen is located and the horizontal plane is a preset angle when the display screen is in the second position state.

Further, the processor 1001 may call the control program for the audio device stored on the memory 1002 and further performs the following operations:

in response to detecting the mobile device is placed on the audio device, acquiring a shielding area generated by the mobile device shielding a playback area of the microphone array; and acquiring the screen placement state of the mobile device according to the shielding area.

Further, the processor 1001 may call the control program for the audio device stored on the memory 1002 and further performs the following operations:

in response to detecting that the mobile device is placed on the audio device, acquiring the screen placement state of the mobile device according to at least one of: whether the sensor or the microphone array obtains a signal, a strength of the signal obtained by the sensor or the microphone array, and an order in which the sensor or the microphone array obtains the signal; and the sensor is at least one of the sensor of the audio device or the sensor of the mobile device, and the sensor is at least one group.

Further, the audio device includes a playing component and a display apparatus rotatably connected to the playing component, and the display apparatus includes the wireless charging module and the display screen.

Referring to FIG. 2, in an embodiment, the control method for the audio device includes:

S10. In response to detecting that a mobile device is placed on the audio device, acquiring a screen placement state of the mobile device, and the screen placement state includes at least one of a screen flat state, a screen horizontal state and a screen vertical state.

In this embodiment, the terminal may be an audio device, or may be a control terminal or a server of the audio device. The following is described by taking the embodiment terminal as an audio device as an example.

It should be noted that the audio device can be a smart loudspeaker, and the mobile device can be a smart phone, a tablet, etc.

Optionally, the audio device includes a playing component and a display apparatus rotatably connected to the playing component, and the display apparatus includes a wireless charging module and a display screen.

Optionally, the wireless charging module is composed of a wireless charging coil, disposed in a rear case of the display screen, and forms a display apparatus together with the display screen. When the mobile device is attached to the display screen of the display apparatus, the audio device can start to wirelessly charge the mobile device. If the display screen has display content before the mobile device is placed on the audio device, the display content of the display screen is switched to be displayed on the screen of the mobile device after the mobile device is placed on the audio device. Certainly, the mobile device that is charged on the audio device also needs to support wireless charging.

Optionally, when the mobile device is placed on the audio device, the screen placement state of the mobile device includes at least one of a screen flat state, a screen horizontal state and a screen vertical state. When the mobile device is in the screen flat state, the screen of the mobile device is placed face up.

Figure 5:
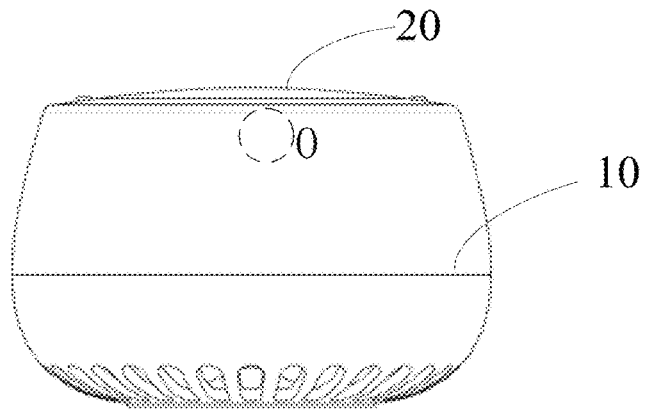
FIG. 5 is a schematic diagram of a first position state of a display screen of the control method for the audio device according to an embodiment of this disclosure.
Figure 7:
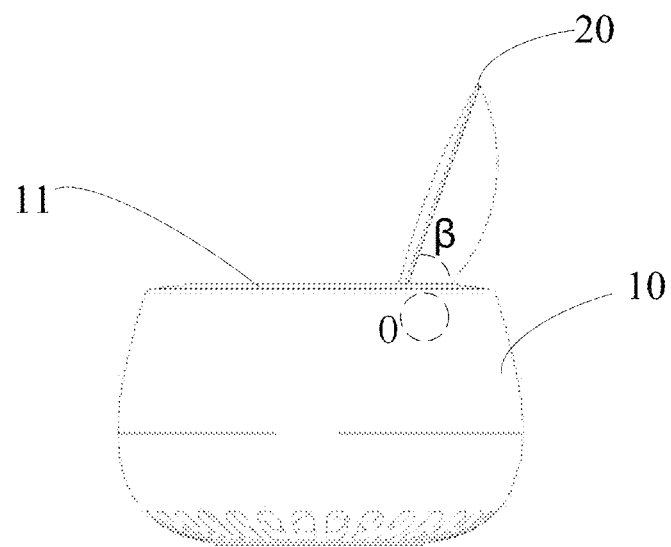
FIG. 7 is a side view of the second position state of the display screen of the control method for the audio device according to an embodiment of this disclosure.

Optionally, referring to FIG. 5, the audio device includes a playing component 10 and a display apparatus 20. The display apparatus 20 is connected to the playing component 10 through a connecting shaft O, and the display apparatus 20 can rotate around the connecting shaft O. The playing component 10 is provided with an accommodating area 11, and the accommodating area 11 is of a spherical structure. As shown in FIG. 7, one side of the display screen of the display apparatus is of a planar structure, and the other side of the display screen of the display apparatus is of a spherical structure matched with the accommodating area 11, and the accommodating area 11 can be configured to accommodate the display apparatus 20. Optionally, when the audio device is smoothly placed on a supporting surface relatively flat with the horizontal plane through the playing component 10, a plane where the accommodating area 11 is located is relatively parallel with the horizontal plane, and when the display apparatus 20 is placed in the accommodating area 11, the display apparatus 20 is relatively parallel with the horizontal plane, and at this time, the display screen of the display apparatus 20 is in a first position state.

Figure 6:
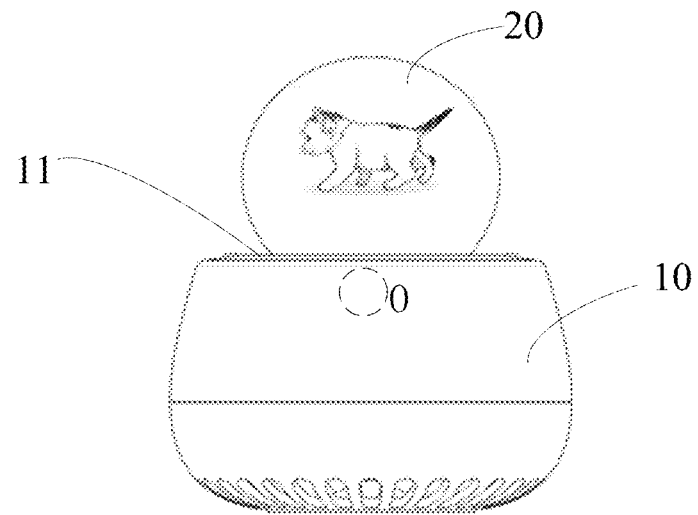
FIG. 6 is a front view of a second position state of the display screen of the control method for the audio device according to an embodiment of this disclosure.
Figure 8:
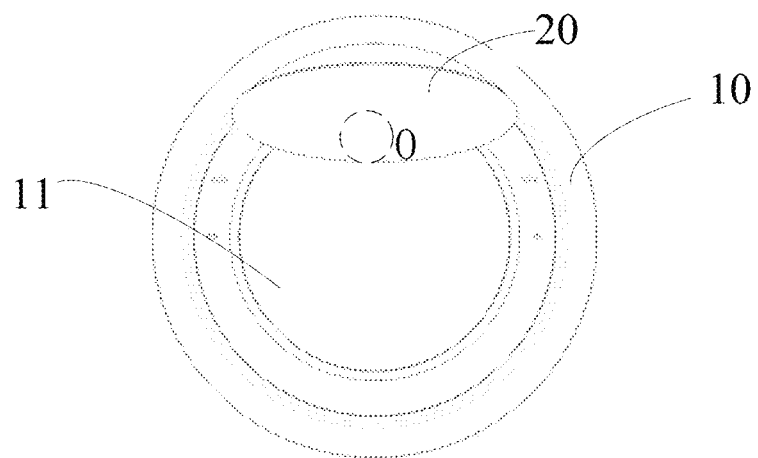
FIG. 8 is a top view of the second position state of the display screen of the control method for the audio device according to an embodiment of this disclosure.

Further, referring to FIGS. 6 to 8, the display apparatus 20 can rotate clockwise or counterclockwise eccentrically around the connecting shaft O relative to the accommodating region 11. Further, an included angle β is formed between a plane where the display screen of the display apparatus 20 is located and the horizontal plane. When the included angle β is 0°, the mobile device is in the screen flat state, namely, the first position state; and when the display apparatus 20 rotates around the connecting shaft O away from the accommodating area 11, the included angle β is greater than 0°, and the display screen of the display apparatus 20 is in a second position state.

Optionally, the connecting shaft O of the audio device is connected with a motor, and the terminal can control the rotation of the display apparatus by driving the motor to rotate. The audio device is rotated relative to the playing component by controlling the display apparatus, so as to control the display screen to switch the position state between the first position state and the second position state.

Optionally, the display apparatus is a circular display apparatus.

It should be noted that when the display screen is in the second position state, the angle β formed between the plane where the display screen is located and the horizontal plane is equal to a preset angle, and a value range of the preset angle can be (0°, 90°]; and when the display screen is in the first position state, the angle β' formed between the plane where the display screen is located and the horizontal plane can be 0°.

Figure 9:
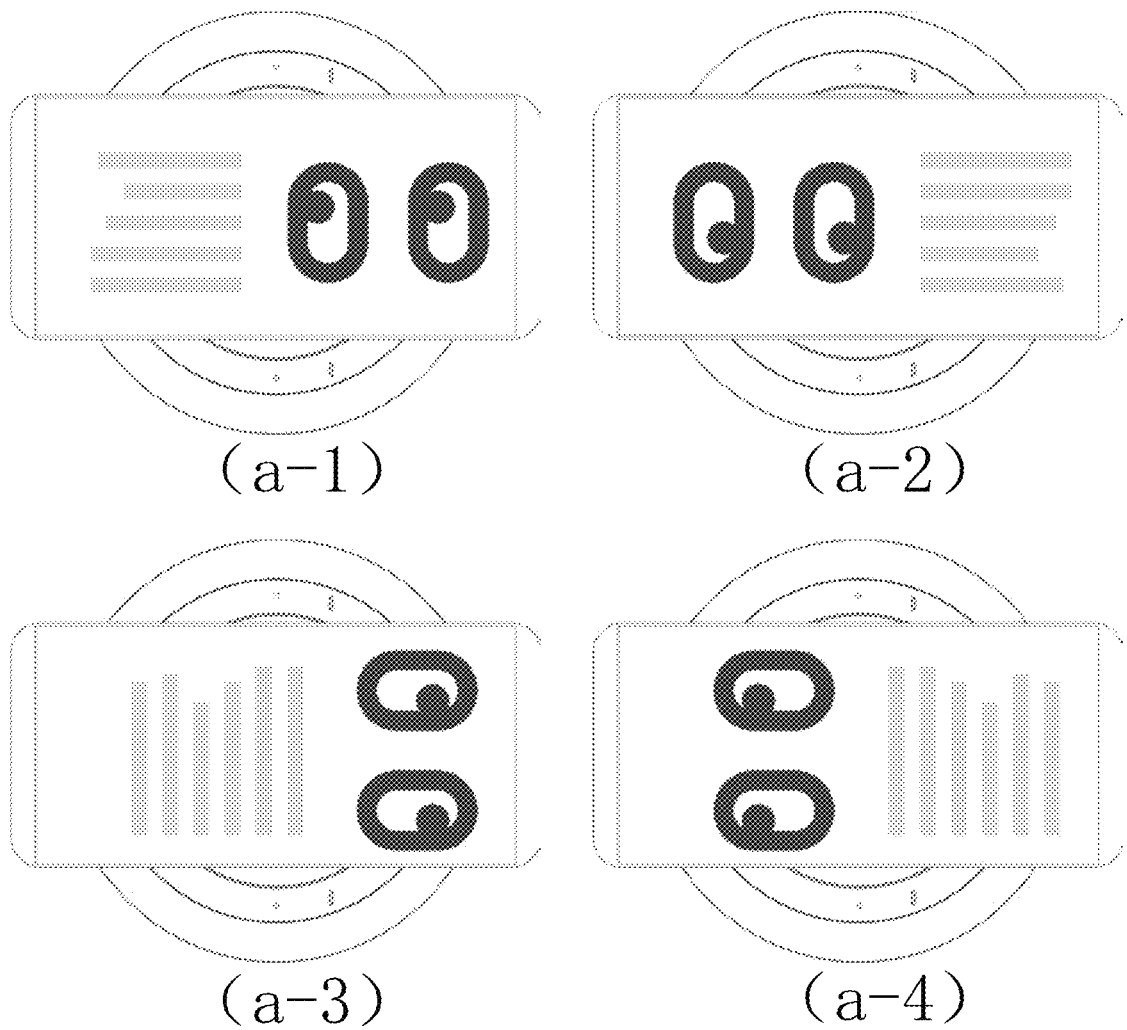
FIG. 9 is a schematic diagram of a screen flat state of a mobile device of the control method for the audio device according to an embodiment of this disclosure.

Optionally, referring to FIG. 9, when the display screen is in the first position state, the user may place the mobile device flat on the display screen for wireless charging. At this time, the screen of the mobile device is in the screen flat state, and at the same time, a plane where the screen of the mobile device is located is also relatively flat with the horizontal plane.

Figure 11:
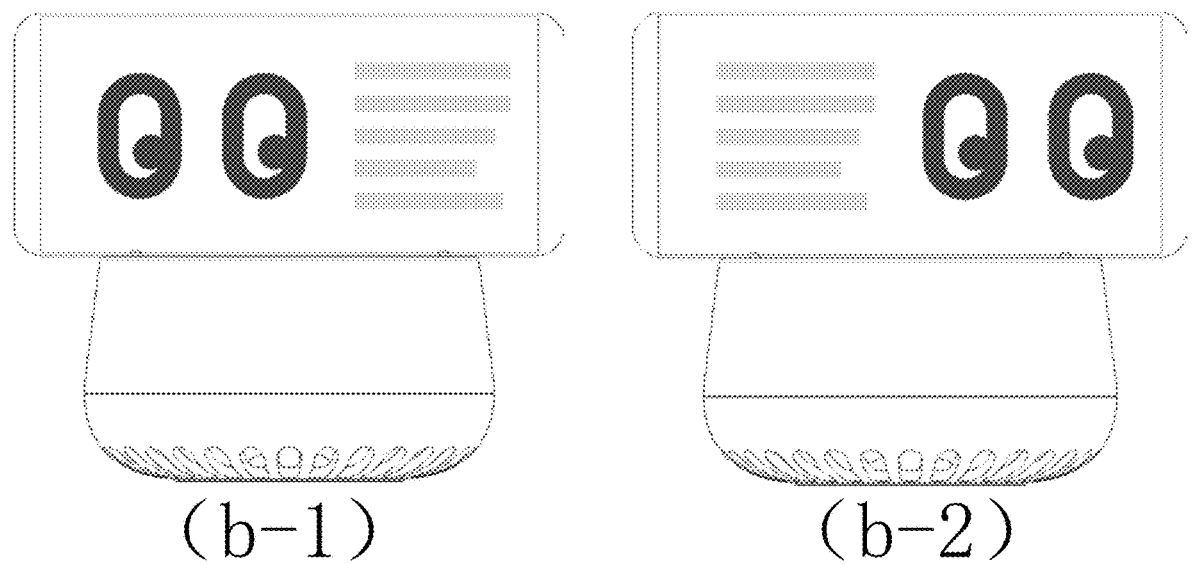
FIG. 11 is a schematic diagram of a screen horizontal state of the mobile device of the control method for the audio device according to an embodiment of this disclosure.

Optionally, referring to FIG. 11, when the display screen is in the second position state, the user may attach the horizontally disposed mobile device to the display screen for wireless charging. At this time, a lateral side of the mobile device is in contact with the accommodating area of the playing component, and the angle between the plane where the screen of the mobile device is located and the horizontal plane is equal to the preset angle, which is equal to the angle β formed between the plane where the display screen of the audio device is located and the horizontal plane.

Figure 12:
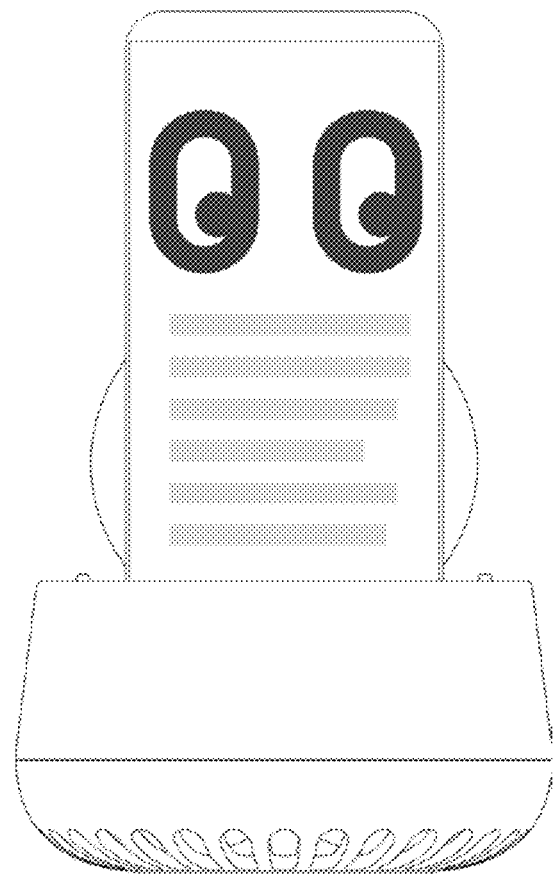
FIG. 12 is a schematic diagram of a screen vertical state of the mobile device of the control method for the audio device according to an embodiment of this disclosure.

Optionally, referring to FIG. 12, when the display screen is in the second position state, the user may attach the vertically disposed mobile device to the display screen for wireless charging. At this time, a bottom side of the screen of the mobile device is in contact with the accommodating area of the playing component, and the angle between the plane where the screen of the mobile device is located and the horizontal plane is equal to the preset angle, which is equal to the angle β formed between the plane where the display screen of the audio device is located and the horizontal plane.

Optionally, the terminal can detect whether the mobile device is placed on the audio device through the display screen and/or a pressure sensor on the playing component. Or, when the terminal detects that the mobile device is wirelessly charged by the wireless charging module, it is determined that the mobile device is placed on the audio device.

Optionally, when the terminal detects that the mobile device is wirelessly charged by the wireless charging module, the terminal acquires the position state of the display screen, and determines the placement state of the screen of the mobile device according to the position state.

Optionally, a microphone array is arranged on the playing component, and a playback area of the microphone array is composed of playback areas of multiple microphones. Optionally, the microphone array is a ring microphone array, which is arranged at a top of the audio device, and the accommodating area of the playing component is arranged at an inner side of the ring microphone array. When the mobile device is placed on the audio device for wireless charging, the microphone array will be shielded to a certain extent to form a certain shielding area.

Optionally, the terminal is set with a microphone pickup algorithm, which can calculate a number of microphones shielded by the mobile device when charging according to the pickup algorithm. The larger the number of shielded microphones obtained, the larger the shielding area formed by the mobile device shielding the microphone array. Different screen placement states of the mobile device are associated with different preset area value intervals, and the terminal can determine the current screen placement state of the mobile device according to the preset area value interval of the detected shielding area.

It should be noted that a preset area value interval corresponding to the screen flat state is higher than a preset area value interval corresponding to the screen horizontal state, and the preset area value interval corresponding to the screen horizontal state is higher than a preset area value interval corresponding to the screen vertical state.

Optionally, the audio device and the mobile device can also correspond to at least one or several groups of sensors, it is determined the screen of the mobile terminal is in the screen flat state, the screen horizontal state or the screen vertical state according to whether sensors at different positions are triggered and the signal strengths after being triggered. The sensors can be infrared sensors, Hall sensors, pressure sensors, gravity sensors, etc., and other forms of sensors. There is no restriction here.

S20. Displaying display content of the display screen on a screen of the mobile device according to the screen placement state.

Optionally, after determining the screen placement state of the mobile device, the terminal determines a display mode of the display content of the display screen of the audio device when displayed on the screen of the mobile device according to the screen placement state.

Optionally, the display mode includes a horizontal screen display mode and a vertical screen display mode.

Optionally, the vertical screen display mode includes at least one of a first display mode and a second display mode. The first display mode is to control display content to be arranged and displayed from a top border to a bottom border of the mobile device, and the second display mode is to control display content to be arranged and displayed from the bottom border to the top border of the mobile device.

Optionally, the horizontal screen display mode includes at least one of a third display mode and a fourth display mode. The third display mode is to control display content to be arranged and displayed from left to right when the top border of the mobile device is taken as a left side, and the fourth display mode is to control display content to be arranged and displayed from right to left when the bottom border of the mobile device is taken as a right side.

Optionally, each screen placement state is associated with at least one display mode in advance. After determining the screen placement state of the mobile device, the terminal acquires the display mode associated with the screen placement state, and displays the display content of the display screen of the audio device on the screen of the mobile device according to the acquired display mode.

Optionally, the screen flat state is associated with at least one display mode of the first display mode, the second display mode, the third display mode and the fourth display mode; the screen horizontal state is associated with at least one display mode of the third display mode and the fourth display mode; and the screen vertical state is associated with at least one display mode of the first display mode and the second display mode.

Optionally, the mobile device is provided with a gravity sensor, and when the screen of the mobile device is in the screen vertical state, the terminal acquires gravity sensing data detected by the gravity sensor from the mobile device, and determines whether the top border of the mobile device is located below the bottom border or above the bottom border according to the gravity sensing data. When it is determined that the top border of the mobile device is located below the bottom border, the second display mode is acquired; and when it is determined that the top border of the mobile device is located above the bottom border, the first display mode is acquired.

Optionally, both the audio device and the mobile device have Near Field Communication (NFC) functionality, which consists of a reader on the audio device, an electronic tag on the mobile device, and a data management software system. When the mobile device and the display screen of the audio device come into contact, the NFC reader on the audio device side can recognize the NFC electronic tag on the mobile device, and read the detailed information of the current device according to the tag content, such as model, system version, etc. (preset in the electronic tag information). When the mobile device reaches the rated voltage and is turned on, the information of the electronic tag is refreshed and a special frequency signal is sent to inform the terminal that the mobile device has been turned on. After the reader recognizes it, the reader of the audio device sends a series of information such as the WI-FI channel, SSID, password, etc. of the current device to the electronic tag of the mobile device. After the tag is identified, the Wi-Fi information of the mobile device is changed and the two parties establish a WI-FI direct connection. The audio device maps the display content to the screen of the mobile device through the WI-FI Mirrocast function.

In an embodiment, in response to detecting a mobile device is placed on the audio device, a screen placement state of the mobile device is acquired, and the screen placement state includes at least one of a screen flat state, a screen horizontal state and a screen vertical state; and display content of the display screen is displayed on a screen of the mobile device according to the screen placement state. In this way, the display content of the display screen of the audio device is displayed on the screen of the mobile device, so that the mobile device can act as the display screen of the audio device while wirelessly charging, which solves the problem that the display effect of the display screen of the audio device will be affected when the audio device performs wireless charging for the mobile device In a second embodiment, as shown in FIG. 3, on the basis of the embodiment shown in FIG. 2 above, the step of displaying display content of the display screen on a screen of the mobile device according to the screen placement state includes:

S30. In a determination that the screen placement state is the screen flat state, acquiring a position of a user.

S31. Determining the display mode according to the position of the user.

S50. Displaying the display content of the display screen on the screen of the mobile device according to the display mode.

In this embodiment, when detecting that the mobile device placed on the audio device for wireless charging is in the screen flat state, the terminal further acquires the position of the user, and determines the display mode of the display content according to the position of the user.

Optionally, the terminal may acquire the position of the user when it detects that the user is in a working space of the audio device, or may acquire the position of the user when receiving a wake-up voice of the user.

Optionally, after detecting the position of the user, the terminal acquires a border farthest from the position of the user in the four borders of the mobile device as a first border, and acquires another border parallel to the first border as a second border.

Optionally, the terminal controls the display content to be displayed on the screen of the mobile device in a manner arranged from the first border to the second border direction.

Figure 10:
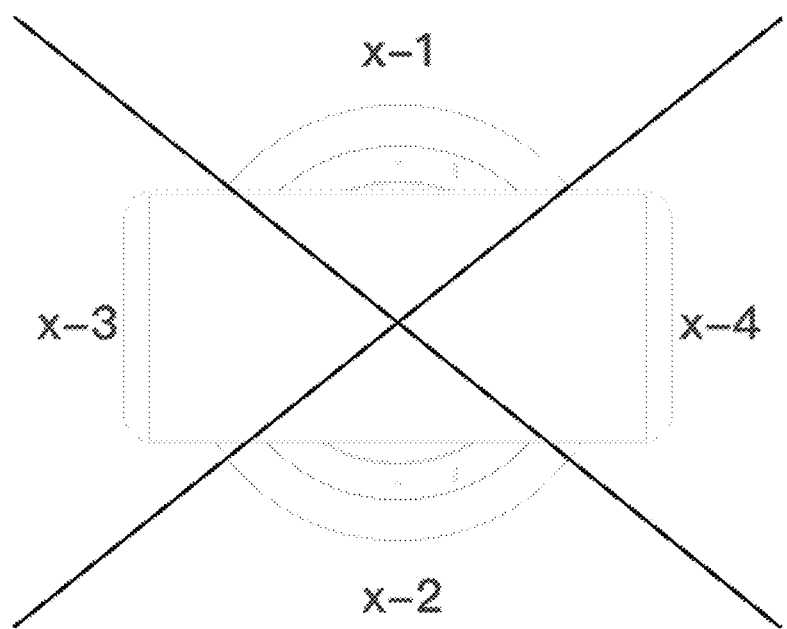
FIG. 10 is a schematic diagram of a preset area of the control method for the audio device according to an embodiment of this disclosure.

Optionally, referring to FIGS. 9 to 10, the working space of the audio device is divided into four preset regions, which are a first region x-1, a second region x-2, a third region x-3, and a fourth region x-4, respectively. Optionally, different preset areas are associated with different display modes. After acquiring the position of the user, the terminal determines the preset area where the position of the user is located, and acquires the display mode associated with the preset area as the display mode of the display content when the mobile device is in the screen flat state. The first region x-1 is associated with a first display mode a-1, the second region x-2 is associated with a second display mode a-2, the third region x-3 is associated with a third display mode a-3, and the fourth region x-4 is associated with a fourth display mode a-4. For example, when the user is standing in the first region x-1, the display mode is the first display mode a-1; when the user is standing in the second region x-2, the display mode is the second display mode a-2; when the user is standing in the third region x-3, the display mode is the third display mode a-3; and when the user is standing in the fourth region x-4, the display mode is the fourth display mode a-4.

In this way, the display orientation of the display content can be made to coincide with the line of sight of the user when viewing the screen.

In a third embodiment, as shown in FIG. 4, on the basis of the embodiment shown in FIGS. 2 and 3 above, the step of displaying display content of the display screen on a screen of the mobile device according to the screen placement state includes:

S40. In a determination that the screen placement state is the screen horizontal state, acquiring a placement mode of the mobile device when placed.

S41. Determining the display mode according to the placement mode.

S50. Displaying the display content of the display screen on the screen of the mobile device according to the display mode.

In this embodiment, when detecting that the mobile device placed on the audio device is in the screen horizontal state, the terminal further acquires the placement mode of the mobile device during placement, and the display mode of the display content may be determined according to the placement mode of the mobile device during placement.

Optionally, the placement mode of the mobile device during placement includes a first placement mode, a second placement mode, and a third placement mode. The first placement mode is that when the user faces the screen of the mobile device, the user places the mobile device from the left side to the right side of the user (indicating that the user is left-handed with a high probability); the second placement mode is that when the user faces the screen of the mobile device, the user places the mobile device from the right side to the left side of the user (indicating that the user is right-handed with a high probability); and the third placement mode is that the posture of the user placing the mobile device is that the left and right sides of the mobile device contact the audio device at the same time. Specifically, the placement mode can be detected by at least one of a sensor disposed on the mobile device, a sensor disposed on the audio device, and a microphone array disposed on the audio device.

Optionally, in the process of placing the mobile device on the audio device, the terminal can detect the sequence of each microphone being shielded in the microphone array based on the pickup algorithm. The terminal may also determine the placement mode of the mobile device based on at least one of the sensors of the audio device or the sensors of the mobile device to detect whether one or more groups of sensors obtain signals, strengths of the acquired signals and a sequence of acquiring the signals.

Optionally, taking using the microphone array of the audio device to determine the placement mode of the mobile device as an example, when the user faces the screen of the mobile device and the terminal detects that the microphone on the left side of the user is shielded before the microphone on the right side of the user, the placement mode is determined to be the first placement mode; when the user faces the screen of the mobile device and the terminal detects that the microphone on the right side of the user is shielded before the microphone on the left side of the user, it is determined that the placement mode is the second placement mode; and when the user faces the screen of the mobile device and the terminal detects that the time for which the microphones on the left and right sides of the user are shielded is approximately equal, it is determined that the placement mode is the third placement mode.

Optionally, as shown in b-2 of FIG. 11, when the terminal detects that the placement mode of the mobile device during placement is the first placement mode, it is determined that the display mode is to control the display content to be arranged and displayed from the right side to the left side of the user, the display content is displayed on the right side, and the operable content is displayed on the left side, so that the left-handers are convenient to operate the operable content in the screen. As shown in b-1 of FIG. 11, when the terminal detects that the placement mode of the mobile device is the second placement mode, it is determined that the display mode is to control the display content to be arranged and displayed from the left side to the right side of the user, the display content is displayed on the left side, and the operable content is displayed on the right side, so that the right-handers are convenient to operate the operable content in the screen. When the terminal detects that the placement mode of the mobile device is the third placement mode, it is determined that the display mode is to control the display content to be arranged and displayed from the left side to the right side of the user.

Certainly, users can also set the display mode corresponding to the placement mode according to their placement habits.

Optionally, when the terminal controls the display content to be displayed on the screen of the mobile device, the display content is displayed according to the display mode corresponding to the placement mode of the mobile device.

In this way, according to the user's habit of using the mobile device, the display mode of the display content is acquired, and the experience of the user when viewing the display content is improved.

In addition, this disclosure further provides an audio device, which includes a wireless charging module and a display screen. The audio device includes a memory, a processor, and a control program for the audio device stored on the memory and operable on the processor, and when the control program for the audio device is executed by the processor, the steps of the control method for the audio device as described in the above embodiments are implemented.

In addition, this disclosure further provides a computer-readable storage medium, which includes a control program for an audio device, and when the control program for the audio device is executed by a processor, the steps of the control method for the audio device as described in the above embodiments are implemented.

The sequence numbers of the above embodiments of this disclosure are for description only, and do not represent the advantages and disadvantages of the embodiments.

Through the description of the above embodiments, those skilled in the art can clearly understand that the methods in the above embodiments can be implemented by means of software plus a necessary general hardware platform, and of course, can also be implemented by hardware, but in many cases the former is optional. Based on this understanding, the technical solution of this disclosure can be embodied in the form of a software product in essence or part that contributes to the prior art, and the computer software product is stored in a storage medium (such as ROM/RAM, magnetic disk, optical disk as described above), including several instructions to make a terminal apparatus (which can be a television, mobile phone, computer, server, controlled terminal, or network equipment, etc.) to implement the method described in each embodiment of this disclosure.

The above are only preferred embodiments of this disclosure and do not limit the scope of this disclosure. Any equivalent structure or equivalent process transformation made by the description and drawings of this disclosure, or directly or indirectly used in other related technical fields are similarly included in the patent protection scope of this disclosure.

What is claimed is:

1. A control method for an audio device, wherein the audio device comprises a wireless charging module and a display screen, and the control method for the audio device comprises the following steps:
    in response to detecting that a mobile device is placed on the audio device, acquiring a screen placement state of the mobile device, wherein the screen placement states comprise at least one of a screen flat state, a screen horizontal state and a screen vertical state;
    acquiring a display mode of display content of the display screen associated with the screen placement state, wherein each screen placement state is associated with at least one display mode in advance;
    determining one display mode from the at least one display mode associated with the screen placement state according to each screen placement state; and
    displaying display content of the display screen on a screen of the mobile device according to a determined display mode.

2. The control method for the audio device of claim 1, wherein the step of determining one display mode from the at least one display mode associated with the screen placement state according to the screen placement state comprises:
    in a determination that the screen placement state is the screen flat state, acquiring a position of a user; and
    determining the determined display mode from the at least one display mode associated with the screen placement state according to the position of the user.

3. The control method for the audio device of claim 1, wherein the step of determining one display mode from the at least one display mode associated with the screen placement state according to the screen placement state comprises:
    in a determination that the screen placement state is the screen horizontal state, acquiring a placement mode of the mobile device when placed; and
    determining the determined display mode from the at least one display mode associated with the screen placement state according to the placement mode.

4. The control method for the audio device of claim 1, wherein the step of acquiring a screen placement state of the mobile device comprises any of the following:
    acquiring the screen placement state of the mobile device according to a sensor of the mobile device;
    acquiring the screen placement state of the mobile device according to a sensor of the audio device;
    acquiring the screen placement state of the mobile device according to a microphone array of the audio device; and acquiring the screen placement state of the mobile device according to a position state of the display screen, wherein the position state comprises a first position state and a second position state, a plane where the display screen is located is parallel to a horizontal plane when the display screen is in the first position state, and an included angle between the plane where the display screen is located and the horizontal plane is a preset angle when the display screen is in the second position state.

5. The control method for the audio device of claim 4, wherein the step of acquiring the screen placement state of the mobile device according to a microphone array of the audio device comprises:
   in response to detecting that the mobile device is placed on the audio device, acquiring a shielding area generated by the mobile device shielding a playback area of the microphone array; and
   acquiring the screen placement state of the mobile device according to the shielding area.

6. The control method for the audio device of claim 4, further comprising:
   in response to detecting that the mobile device is placed on the audio device, acquiring the screen placement state of the mobile device according to at least one of: whether the sensor or the microphone array obtains a signal, a strength of the signal obtained by the sensor or the microphone array, and an order in which the sensor or the microphone array obtains the signal; and
   wherein the sensor is at least one of the sensor of the audio device or the sensor of the mobile device, and the sensor is at least one group.

7. The control method for the audio device of claim 1, wherein the audio device comprises a playing component and a display apparatus rotatably connected to the playing component, and the display apparatus comprises the wireless charging module and the display screen.

8. The control method for the audio device of claim 1, wherein the audio device comprises a playing component and a display apparatus rotatably connected to the playing component, and the display apparatus comprises the wireless charging module and the display screen.

9. The control method for the audio device of claim 2, wherein the audio device comprises a playing component and a display apparatus rotatably connected to the playing component, and the display apparatus comprises the wireless charging module and the display screen.

10. The control method for the audio device of claim 3, wherein the audio device comprises a playing component and a display apparatus rotatably connected to the playing component, and the display apparatus comprises the wireless charging module and the display screen.

11. The control method for the audio device of claim 4, wherein the audio device comprises a playing component and a display apparatus rotatably connected to the playing component, and the display apparatus comprises the wireless charging module and the display screen.

12. The control method for the audio device of claim 5, wherein the audio device comprises a playing component and a display apparatus rotatably connected to the playing component, and the display apparatus comprises the wireless charging module and the display screen.

13. The control method for the audio device of claim 6, wherein the audio device comprises a playing component and a display apparatus rotatably connected to the playing component, and the display apparatus comprises the wireless charging module and the display screen.

14. The control method for the audio device of claim 1, wherein the display mode comprises a horizontal screen display mode and a vertical screen display mode.

15. The control method for the audio device of claim 14, wherein the vertical screen display mode comprises at least one of a first display mode and a second display mode;
   the first display mode is to control the display content to be arranged and displayed from a top border to a bottom border of the mobile device, and the second display mode is to control the display content to be arranged and displayed from the bottom border to the top border of the mobile device.

16. The control method for the audio device of claim 15, wherein the horizontal screen display mode includes at least one of a third display mode and a fourth display mode, the third display mode is to control display content to be arranged and displayed from left to right when the top border of the mobile device is taken as a left side, and the fourth display mode is to control display content to be arranged and displayed from right to left when the bottom border of the mobile device is taken as a right side.

17. The control method for the audio device of claim 16, the screen flat state is associated with at least one display mode of the first display mode, the second display mode, the third display mode and the fourth display mode; the screen horizontal state is associated with at least one display mode of the third display mode and the fourth display mode; and the screen vertical state is associated with at least one display mode of the first display mode and the second display mode.

18. An audio device, comprising a wireless charging module and a display screen, wherein the audio device comprises a memory, a processor, and a control program for the audio device stored on the memory and operable on the processor, and when the control program for the audio device is executed by the processor, the steps of the control method for the audio device as recited in claim 1 are implemented.

19. A non-volatile computer-readable storage medium, wherein a control program for an audio device is stored thereon, and when the control program for the audio device is executed by a processor, the steps of the control method for the audio device as recited in claim 1 are implemented.

* * * * *